(12) United States Patent
Anumala et al.

(10) Patent No.: US 8,929,364 B2
(45) Date of Patent: Jan. 6, 2015

(54) SUPPORTING BGP BASED IP-VPN IN A ROUTED NETWORK

(75) Inventors: Mohnish Anumala, Littleton, MA (US); Roger Lapuh, Thurgau (CH); Paul Ellis Unbehagen, Jr., Apex, NC (US)

(73) Assignee: Avaya Inc., Basking Ridge, NJ (US)

( * ) Notice: Subject to any disclaimer, the term of this patent is extended or adjusted under 35 U.S.C. 154(b) by 431 days.

(21) Appl. No.: 11/935,563

(22) Filed: Nov. 6, 2007

(65) Prior Publication Data

US 2009/0116483 A1 May 7, 2009

(51) Int. Cl.
- *H04L 12/28* (2006.01)
- *H04L 12/46* (2006.01)
- *H04L 12/715* (2013.01)

(52) U.S. Cl.
CPC ........ H04L 12/4641 (2013.01); H04L 12/4633 (2013.01); H04L 45/04 (2013.01)
USPC ... 370/389; 370/399; 370/395.3; 370/395.53; 370/401; 370/410

(58) Field of Classification Search
None
See application file for complete search history.

(56) References Cited

U.S. PATENT DOCUMENTS

| | | | |
|---|---|---|---|
| 7,185,107 B1 * | 2/2007 | Cassar ........................ | 709/239 |
| 7,260,648 B2 * | 8/2007 | Tingley et al. ................ | 709/245 |
| 2004/0006708 A1 * | 1/2004 | Mukherjee et al. .......... | 713/201 |
| 2004/0047353 A1 * | 3/2004 | Umayabashi et al. ... | 370/395.63 |
| 2005/0190757 A1 | 9/2005 | Sajassi | |
| 2006/0164975 A1 * | 7/2006 | Filsfils et al. ................. | 370/225 |
| 2006/0171404 A1 | 8/2006 | Nalawade et al. | |
| 2006/0182122 A1 * | 8/2006 | Davie et al. ............... | 370/395.53 |
| 2006/0198368 A1 | 9/2006 | Guichard et al. | |
| 2006/0233181 A1 | 10/2006 | Raszuk et al. | |
| 2007/0019676 A1 * | 1/2007 | Kompella ..................... | 370/468 |
| 2007/0110025 A1 * | 5/2007 | Guichard et al. ............. | 370/351 |
| 2008/0092229 A1 * | 4/2008 | Khanna et al. ................. | 726/15 |

OTHER PUBLICATIONS

Bates, T. & Rekhter, Y. "Multiprotocol Extensions for BGP-4". RFC 2858. IETF. Jun. 2000. pp. 1-11. <http://tools.ietf.org/html/rfc2858>.*

Rosen, E. & Rekhter, Y. "BGP/MPLS VPNSs" RFC 2547. IETF Mar. 1999. pp. 1-25. <http://tools.ietf.org/html/rfc2547>.*

Rosen Cisco Systems E et al: "BGP/MPLS IP Virtual Private Networks (VPNs); rfc4364.txt" IETF Standard Internet Engineering Task Force, IETF, CH Feb. 1, 2006, XPO15044797, ISSN: 0000-0003, pp. 1-47.*

(Continued)

*Primary Examiner* — Faruk Hamza
*Assistant Examiner* — Thinh Tran
(74) *Attorney, Agent, or Firm* — Anderson Gorecki & Rouille LLP (57) ABSTRACT

A new type of Provider Edge (PE) device is used to support BGP-based IP-VPNs. Each VRF instance in a PE device is associated with a dedicated IP address (Service IP address). Each service IP address is dedicated to a VRF in a PE device. The service IP address is distributed by BGP for VPN route association. Customer/VRF IP packets can be sent to a VRF instance in the egress PE device using service IP header encapsulation (with IP Destination Address=Service IP address of egress PE's VRF & IP Source Address=Service IP address of ingress PE's VRF). This obviates the need for explicit tunnels in the core.

20 Claims, 7 Drawing Sheets

| Ethernet Header DMAC=IngPE | Customer IP Header | Customer IP Payload |
|---|---|---|

Packet from CE device to Ingress PE device

| Ethernet Header DMAC=Next-hop router | Service IP Header | Customer IP Header | Customer IP Payload |
|---|---|---|---|

Packet from Ingress PE device to Egress PE device (56) References Cited

OTHER PUBLICATIONS

Mark Townsley Cisco Systems Ted Seely Sprint W: BGP/MPLS IP VPNs over Layer 2 Tunneling Protocol ver 3: draft-townsley-13vpn-12tpv3-01.txt IETF Standard-Working-Draft, Internet Engineering Task Force, IETF, CH, No. 1, Jan. 1, 2004 (Feb. 1, 2004), XPO15039778, ISSN: 0000-0004, pp. 1-12.

Pradosh Mohapatra Cisco Systes et al: "BGP Information SAFI and BGP Tunnel Encapsualtion Attribute; draft-pmohapat-idr-info-safi-00.txt" IETF Standard-Working-Draft, Internet Engineering Task Force, IETF, CH, Sep. 1, 2006, XPO15048448, ISSN: 0000-0004, pages pp. 1-10.

Search Report 07863943.2—2416 / 2087419 PCT/US2007083716, dated Sep. 28, 2011, 8 pages.

\* cited by examiner

| Ethernet Header DMAC=IngPE | Customer IP Header | Customer IP Payload |

Packet from CE device to Ingress PE device

| Ethernet Header DMAC=Next-hop router | Service IP Header | Customer IP Header | Customer IP Payload |

Packet from Ingress PE device to Egress PE device

SUPPORTING BGP BASED IP-VPN IN A ROUTED NETWORK

CROSS-REFERENCE TO RELATED APPLICATIONS

A claim of priority is made to U.S. Provisional Patent Application No.60/866,703, entitled METHOD TO SUPPORT BGP BASED IP-VPN IN A ROUTED NETWORK WITHOUT MPLS AND EXPLICIT TUNEL SET-UP, filed Nov. 21, 2006, which is incorporated by reference.

FIELD OF THE INVENTION

This invention relates generally to the field of network communications, and more particularly to BGP based IP-VPNs which do not require MPLS and explicit tunnel set-up.

BACKGROUND OF THE INVENTION

Figure 1:
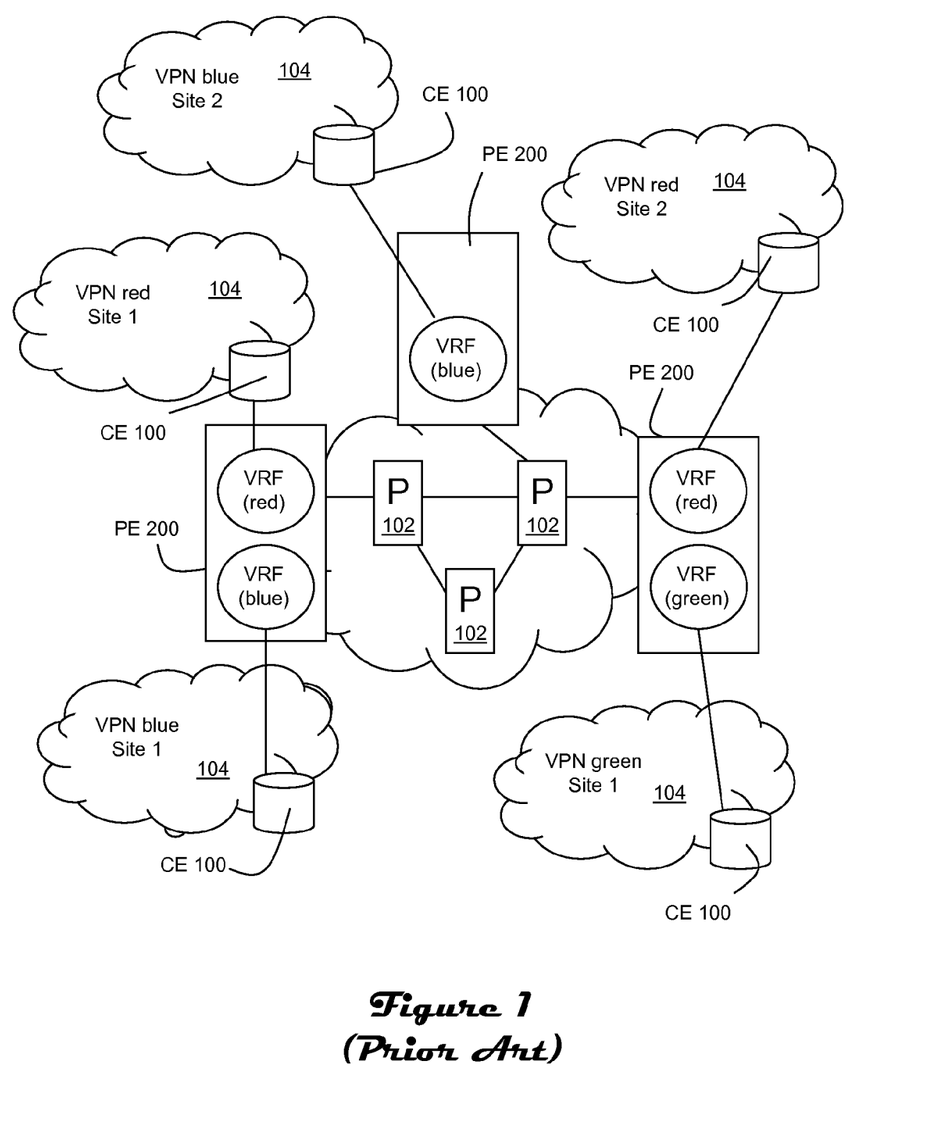
FIG. 1 illustrates a prior art IP-VPN architecture.

FIG. 1 illustrates an Internet Protocol Virtual Private Network (IP-VPN) architecture. The architecture includes a plurality of VPN Sites, each of which includes a set of devices such as routers which share IP connectivity. Customer Edge (CE) devices (100) place VPN sites (104) in communication with Provider Edge (PE) devices (200), thereby allowing the VPN sites to communicate with other VPN sites (which belong to the same VPN) via the PE devices. The PE devices also allow remote access to other VPNs which are locally supported by the PE device. The PE devices track VPN routing information learned both locally and remotely. In MPLS networks, the PE devices also function as Label Edge Routers (LERs) which terminate Label Switched Path (LSP) tunnels used to forward traffic between PE devices. Provider (P) devices (102) are backbone routers which provides connectivity between PE devices. The Provider devices are not directly connected to any CE device and have no knowledge of VPN routes.

Figure 2:
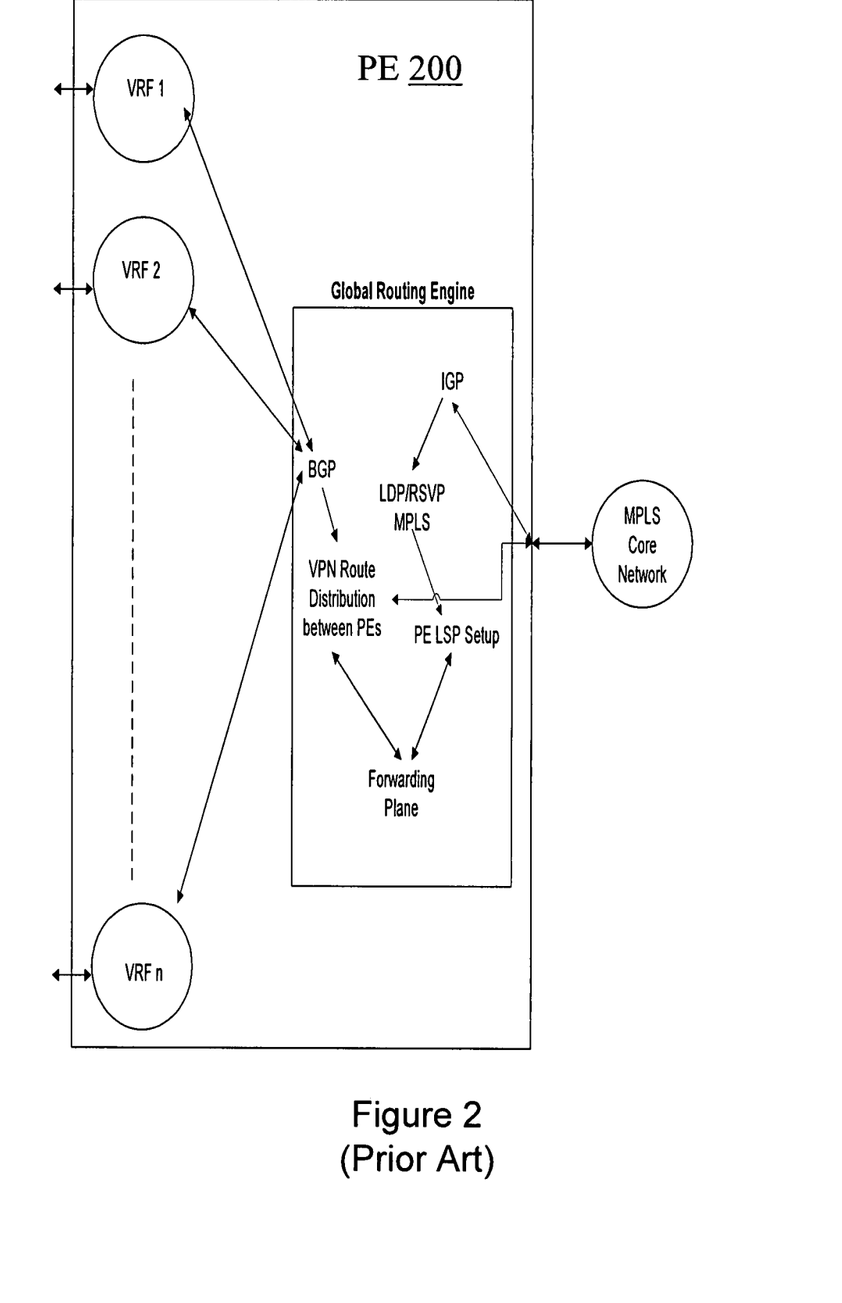
FIG. 2 illustrates a prior art provider edge (PE) device.

FIG. 2 is a block diagram of a typical prior art PE device (200) capable of IP-VPN operation. The prior art PE device has five major functional blocks: an IGP protocol (e.g., OSPF, IBGP etc.) across the core network connecting the remote PE devices; Virtual Route Forwarders (VRFS) for customer traffic separation; an MPLS subsystem for Label Switched Path (LSP) setup and maintenance; BGP with multi-protocol extensions (MP-iBGP) to exchange VPN routes and service labels with the remote PE devices; and an IP-VPN Forwarding plane to encapsulate the customer IP packet with two or more MPLS labels. The Virtual Route Forwarders (VRFS) provide traffic isolation between customers operating over the same node. A virtual router emulates the behavior of a dedicated hardware router by providing separate routing functionality, and is treated by the network as a separate logical router. Each VRF is capable of routing traffic among the IP interfaces directly connected to it without MPLS encapsulation. The IP-VPN block allows the interconnection of VRFs in several different PE devices and data traffic between the PEs. The MPLS subsystem is responsible for establishing, deleting, and maintaining label switched path (LSP) tunnels between PE routers using LDP or RSVP-TE. PE routers use BGP to distribute VPN routes to each other. Each VPN is allowed to have its own address space, which means that the same address can be used in any number of VPNs, wherein each VPN the address denotes a different system. If two sites of a VPN attach to PE routers, which are in the same Autonomous System, the PE routers can distribute VPN-IPv4 routes to each other by means of an IBGP connection between them. Alternatively, each can have an MP-BGP connection to a route reflector. Routes are learned from the core network and provided to LDP. LDP sets up LSPs with the PE devices connected to core network. Alternatively RSVP (with TE extensions) can be used to set up LSPs between PE devices. Local VRFs learn routes from CE devices and export them to BGP. BGP distributes these VPN routes along with the assigned service labels to other PE devices. BGP learns the VPN routes from other PE devices and distributes them to local VRFs. BGP will support multi-protocol extensions, route distinguisher, and route targets to achieve this. Using the service label that BGP learned for a VPN route and the LSP set up by the MPLS signaling protocol to the remote PE device, PE device software will create a tunnel in the data-path for the CE packets that need to reach the remote VRF. The PE device will perform a VPN route lookup upon receiving a packet from the CE device. If the result of the lookup is the remote VRF, then packets will be tunneled to the destination PE device. Typically, the PE router will encapsulate a packet from a CE device with two MPLS labels—a tunnel (outer) label is used for reaching the destined PE device, and a service (inner) label is used for VPN identification at the destination PE.

PE devices (200) are used successfully with MPLS core networks with IP-VPN architectures such as illustrated in FIG. 1 by large communications service providers. However, other large organizations in need of IP-VPN services in their own networks do not always favor MPLS core network solutions. For example, some large enterprises and universities have existing networks based on "pure IP," and prefer to avoid migration to an MPLS core network because of the cost of acquiring new equipment and expertise. Further, some communications service providers may have need of an IP-VPN architecture with an IP core.

One technique for achieving an "IP core" IP-VPN is to implement GRE-IP tunnels between the PE routers, encapsulate the MPLS labeled packets with GRE-IP headers, and tunnel the packets across the routed core network. This technique has been proposed in the IETF draft: "Use of PE-PE GRE or IP in BGP/MPLS IP Virtual Private Networks draft-ietf-13vpn-gre-ip-2547-05." However, the technique requires MPLS equipment and expertise because MPLS is used to identify a VPN route, and an MPLS label stack is added to the VPN packets (between the ingress and egress PE router, the outermost member of the label stack will represent the VPN route label). Further, an MPLS-in-GRE or MPLS-in-IP encapsulation is used to convert the MPLS packet back into an IP packet (which creates a GRE or an IP tunnel between the ingress PE router and the egress PE router). This GRE-IP tunnel based solution has the complexity of a full mesh of GRE tunnels between PE devices. Further, because network complexity tends to increase and GRE tunnels are stateless, network convergence time may increase in the case of failure. Another technique, described in RFC4364, requires MPLS service and tunnel label encapsulation, including a label stack in the NLRI field. An alternative solution without the same drawbacks and requirements would be desirable.

SUMMARY OF THE INVENTION

In accordance with one embodiment of the invention, apparatus for providing virtual private network service in a routed network comprises: at least one source virtual route forwarder; a protocol engine operable to exchange routes and service addresses, including a service address dedicated to the source virtual route forwarder; and a forwarding plane operable to encapsulate a received protocol data unit with a service header, the service header including the service address associated with the source virtual route forwarder and a service address associated with a destination virtual route forwarder, and to transmit the encapsulated protocol data unit to a peer device.

In accordance with another embodiment of the invention, a method for providing virtual private network service in a device of a routed network comprises: exchanging routes and service addresses, including a service address dedicated to a source virtual route forwarder of the device; encapsulating a received protocol data unit with a service header, the service header including the service address associated with the source virtual route forwarder and a service address associated with a destination virtual route forwarder; and transmitting the encapsulated protocol data unit to a peer device.

Various advantages are provided by particular embodiments of the invention. For example, MPLS and its signaling protocols (LDP, RSVP-TE) are not required. Further, the forwarding plane will encapsulate the customer IP packet with a service IP header and forward the packet to egress PE. In contrast, RFC4364 requires MPLS service and tunnel label encapsulation. Further, interpretation of MP-REACH-NLRI and MP-UNREACH-NLRI is different; the prior art IPVPN requires a label stack in the NLRI field, while the invention can use the service IP address (service IP address assigned to a VRF in the egress PE) as the next-hop address. A route distinguisher can be used as the Service IP address. Particular distinctions and advantages also exist with regard to draft-ietf-l3vpn-gre-ip-2547-05. The draft-ietf-l3vpn-gre-ip-2547-05 requires provisioning of GRE tunnels between PE devices, and may actually require a full mesh of GRE-IP tunnels between PE devices. In contrast, the invention does not require tunnel setup. The draft-ietf-l3vpn-gre-ip-2547-05 requires MPLS and its signaling protocols in implementing the IPVPN. In contrast, the invention doesn't require MPLS. Because GRE tunnels are stateless, network convergence time may increase in the case of failure using draft-ietf-l3vpn-gre-ip-2547-0. IGP will handle failures in the routed core network in particular embodiments of the invention. Further, particular embodiments of the invention are capable of plug-n-play operation, whereas the draft-ietf-l3vpn-gre-ip-2547-05 is not.

DETAILED DESCRIPTION

The terms "Customer Edge" and "Provider Edge" are used in this document to describe particular devices in a network architecture because those terms have become conventional in the art, and will thus facilitate description of embodiments of the invention and appreciation of the distinctions relative to the prior art. However, the terms are not intended to be limiting in any way, and particularly do not imply that a customer or provider will necessarily control and use the devices. Indeed, one advantage of the invention is that a single organization can implement a BGP-based IP-VPN by using the Customer Edge (CE) devices, Provider Edge (PE) devices and Provider Routers described below.

Figure 3:
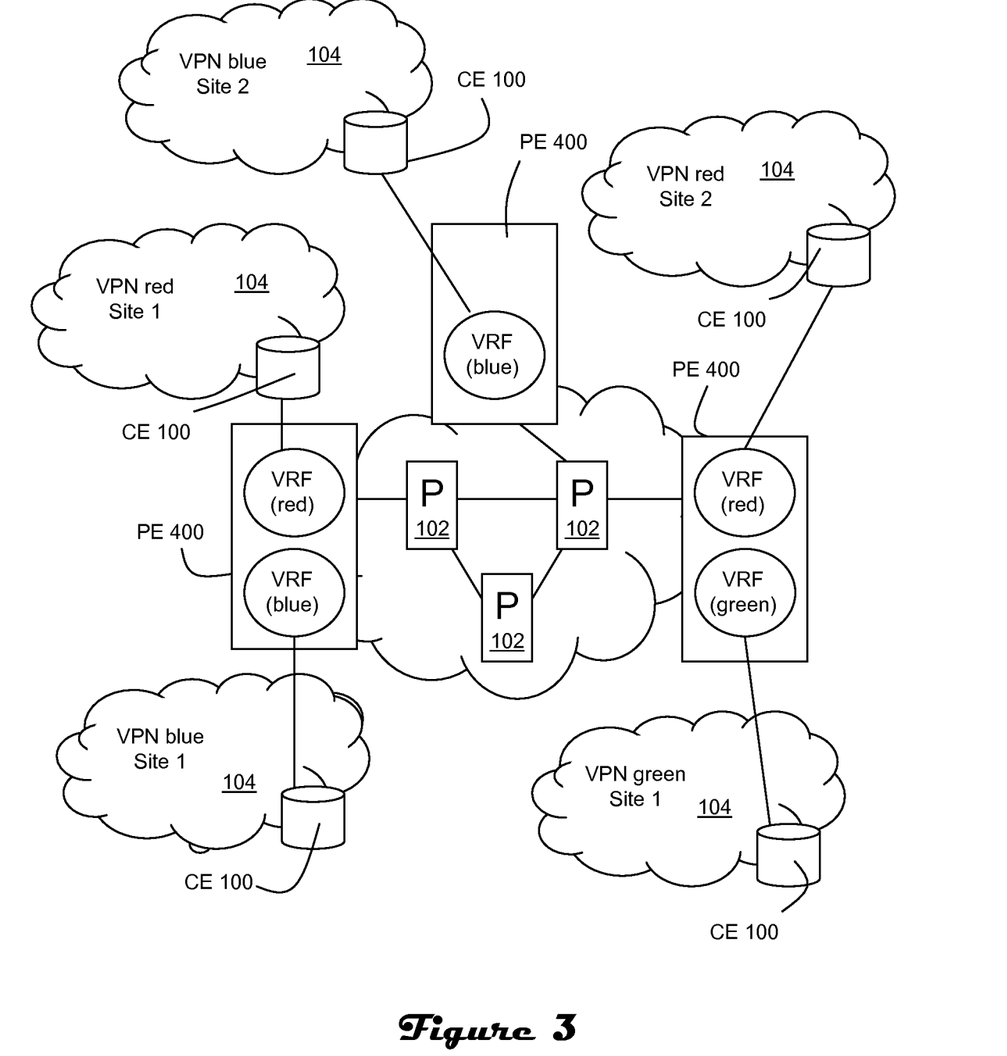
FIG. 3 illustrates a BGP-based IP-VPN architecture.
Figure 4:
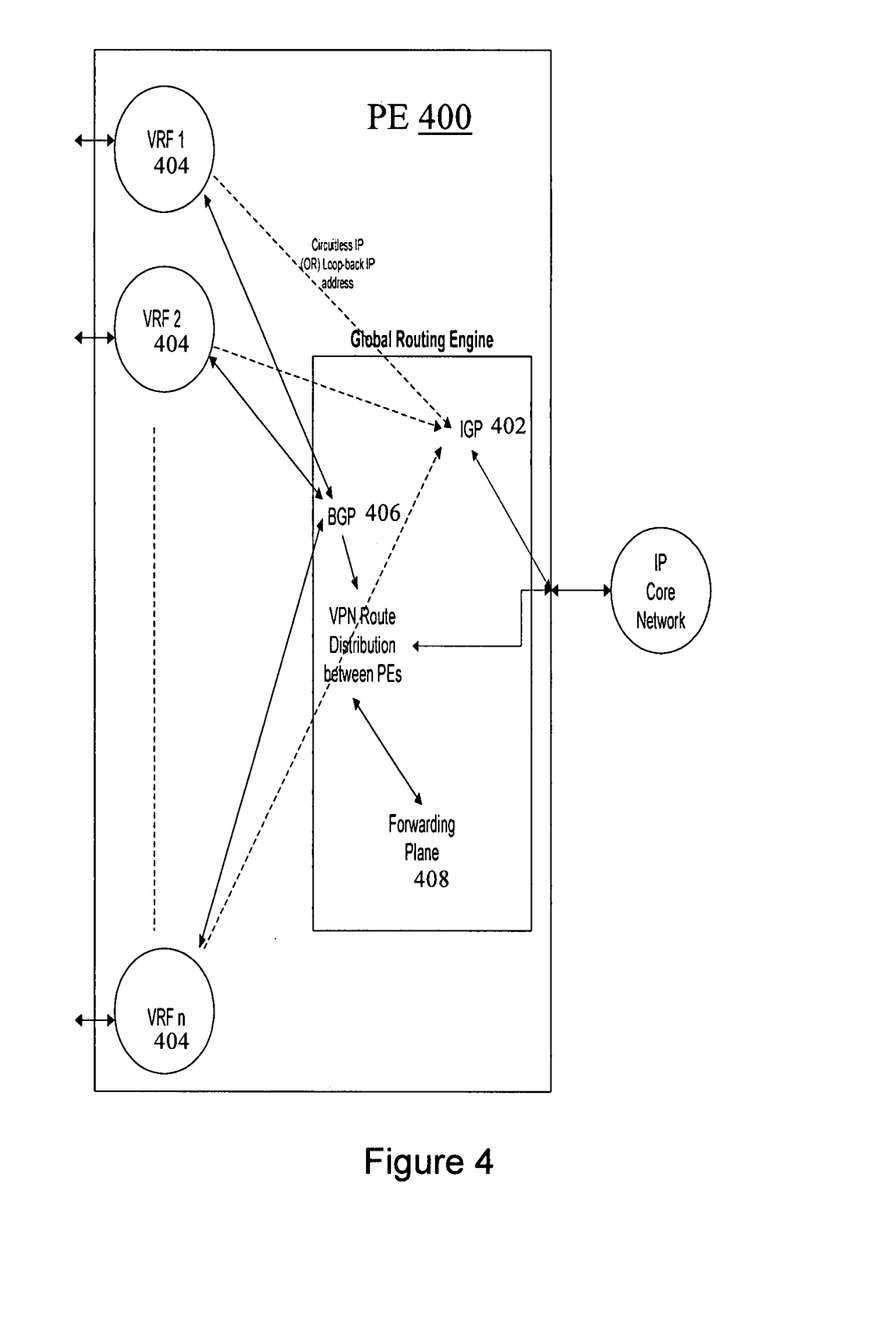
FIG. 4 illustrates a Provider Edge (PE) device that supports operation of the architecture of FIG. 3.
Figure 5:
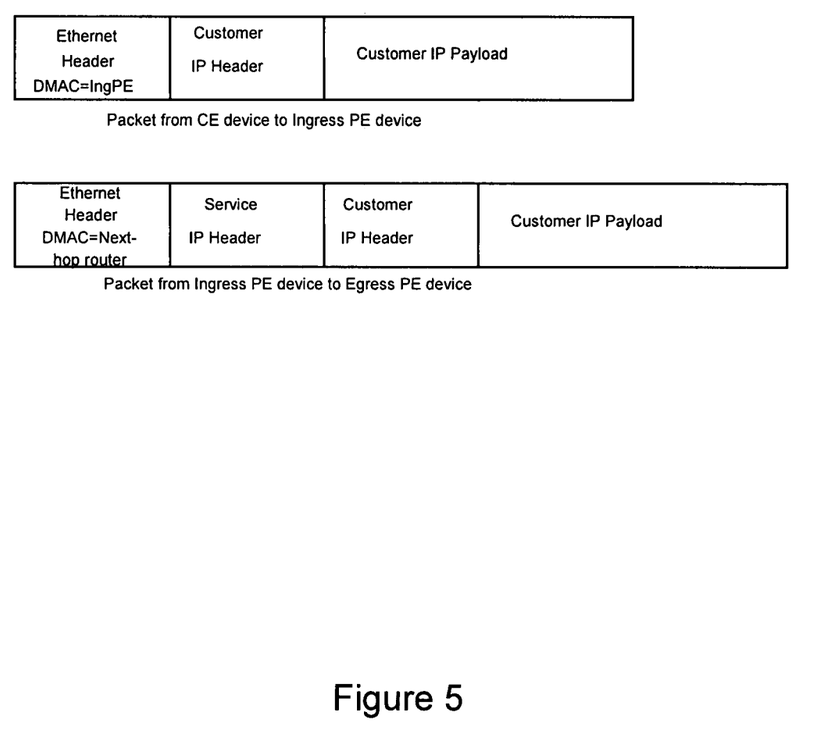
FIGS. 5 and 6 illustrate packet format for the architecture of FIG. 3.
Figure 6:
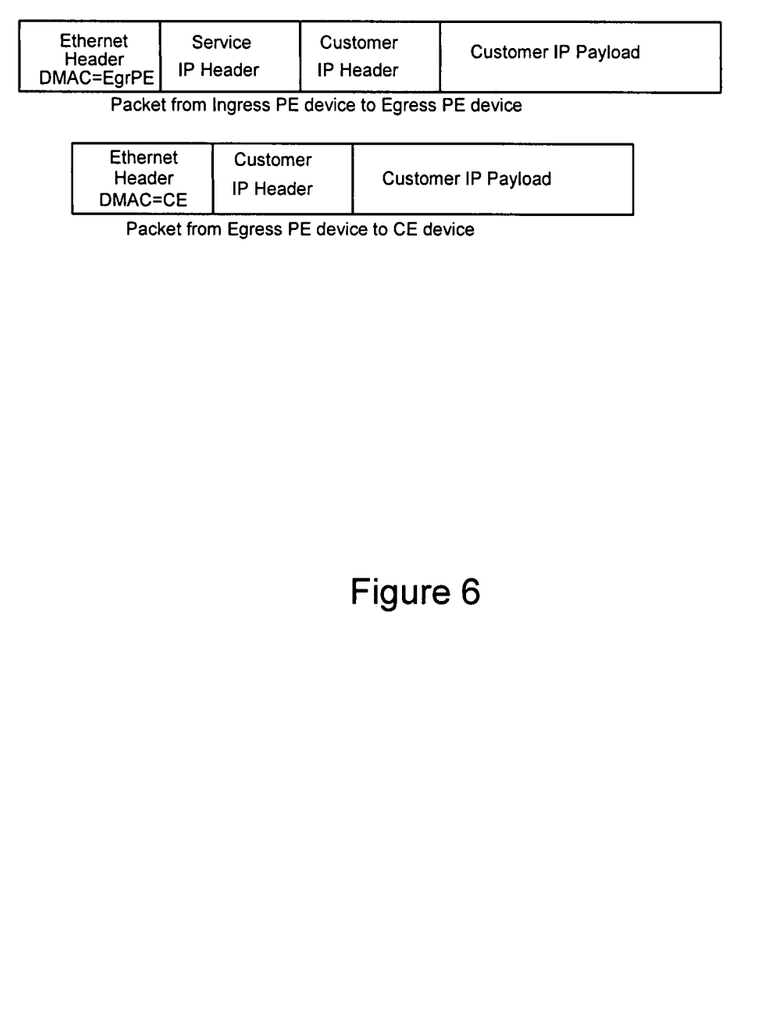

Referring to FIGS. 3 and 4, a BGP based IP-VPN architecture implemented with at least two IP-VPN capable Provider Edge (PE) devices (400) does not require MPLS and explicit tunnel set-up. The PE device (400) has four major function engines: IGP protocol (402) (e.g., OSPF, IBGP, etc.) across the core network connecting the remote PE devices; Virtual Route Forwarders (VRFs) (404) for customer traffic separation; BGP (406) with multi-protocol extensions (MP-iBGP) to exchange VPN routes and service IP address with the remote PE devices; and an IPVPN forwarding plane (408) to encapsulate the customer IP packet into a service IP header. There is no need for an MPLS subsystem because the forwarding plane (408) utilizes the service IP header rather than MPLS labels, and MP-iBGP exchanges service IP addresses with VPN routes rather than service labels. Each VRF in a PE device dedicates an IP address to the IP-VPN. In order to distinguish that dedicated IP address from other IP addresses in this description, the dedicated IP address is referred to as the "service IP address." One implementation of the service IP address is a loop-back IP address. The service IP address should be unique in the core network, and should not be used for "regular" or protocol traffic of the VRF, although variants in which service IP addresses are also used for regular, protocol traffic are deemed to be within the scope of the invention. Each VRF exports its service IP address to the IGP protocol running in the global routing engine on the local PE device. IGP distributes service-IP addresses such that devices connected to the core network can reach the VRFs associated with the service-IP addresses. If one service IP address is used per VRF, then the forwarding element in the PE device is able to find the destination VRF for a packet by executing a lookup of the service destination IP address. The PE then forwards the packet in the VRF using the destination IP address in the customer IP header to support traffic flow from the core to the edge.

In an alternative embodiment a circuit-less IP address is used as the service IP address for each VRF next-hop, i.e., multiple service IP addresses per VRF. In this embodiment the destination PE device performs a lookup on the destination service IP address, and performs packet processing based on the result, thereby improving performance by eliminating the need for a lookup on the customer destination IP. However, this alternative embodiment may require more service addresses per VRF.

As shown below, the service IP header includes the remote VRF service IP address in the destination IP address field, and the local VRF service IP address in the source IP address field. The protocol type can be IP in IP (4) or GRE (47).

```
-continued
|         Identification         |Flags|      Fragment Offset      |
+-+-+-+-+-+-+-+-+-+-+-+-+-+-+-+-+-+-+-+-+-+-+-+-+-+-+-+-+-+-+-+-+
|  Time to Live | Protocol=4/47  |       Header Checksum          |
+-+-+-+-+-+-+-+-+-+-+-+-+-+-+-+-+-+-+-+-+-+-+-+-+-+-+-+-+-+-+-+-+
|         Source Address = local VRF service IP address           |
+-+-+-+-+-+-+-+-+-+-+-+-+-+-+-+-+-+-+-+-+-+-+-+-+-+-+-+-+-+-+-+-+
|      Destination Address = remote VRF service IP address        |
+-+-+-+-+-+-+-+-+-+-+-+-+-+-+-+-+-+-+-+-+-+-+-+-+-+-+-+-+-+-+-+-+
|                    Options                     |    Padding     |
+-+-+-+-+-+-+-+-+-+-+-+-+-+-+-+-+-+-+-+-+-+-+-+-+-+-+-+-+-+-+-+-+
```

BGP-4 capability may be augmented so that PE devices can exchange the ability to use the service IP addresses as the next-hop address in the VPN route exchange.

MP-iBGP or MP-eBGP is utilized for VPN route distribution. In particular, MP-iBGP uses the service IP address of the corresponding local VRF as the next-hop address in its update message. The BGP update message format need not be modified. Several techniques may be employed to cause the BGP speaker to inform peers of the service IP address as the next-hop. Modifying the BGP update message format is not necessarily required. A first technique is to use the next-hop field in MP-REACH-NLRI, MP-UNREACH-NLRI to advertise the service IP address. This technique utilizes an update message for each individual VRF. A second technique is to store the first 12-bits of the service IP address in the next-hop field and the other 20-bits in the service label location of the MP-REACH-NLRI, MP-UNREACH-NLRI. In a third technique the RD value of the VRF is created using the service IP address as the IP address in the Type 1 format of Route Distinguisher (RD). The service label is kept empty in the MP-REACH-NLRI, MP-UNREACH-NLRI. A fourth technique is to create a new format for MP-REACH-NLRI. Regardless of the route distribution technique, when the MP-BGP peer receives the VPN route, it stores the VPN route and service IP address (of the remote VRF) in the BGP RIB-IN. The peer then runs its route selection process and updates its local RIB. If the VPN route is selected to program the switch forwarding plane, then a service IP header is constructed with the next-hop address in the BGP update message as the destination IP address and this is programmed into VPN FIB. The VPN route is also associated with the service IP header in the forwarding plane. The four route distribution techniques will now be described and illustrated in greater detail.

In accordance with the first technique for BGP Route distribution, the service label is left unused in MP-REACH-NLRI, MP-UNREACH-NLRI. The format of the MP-REACH-NLRI used by the Ingress PE is shown below. The next-hop address in the BGP update will have the service IP address. There will not be a service label in the MP-REACH-NLRI.

> Address Family Identifier (2 octets)
> Subsequent Address Family Identifier (1 octet)
> Length of Next Hop Network Address (1 octet)
> Network Address of Next Hop (variable) = service
> IP address of the local VRF
> Number of SNPAs (1 octet)
> Length of first SNPA(1 octet)
> First SNPA (variable)
> Length of second SNPA (1 octet)
> Second SNPA (variable)
> . . .
> Length of Last SNPA (1 octet)
> Last SNPA (variable)
> Network Layer Reachability Information (variable)
> zero length MPLS label stack This may require that the BGP update message is limited to a single VRF source because the next-hop address is the Service IP address, which belongs to a single VRF. As a consequence, many BGP updates may be required if the PE has many VRFs. However, the format of the MP-REACH-NLRI, MP-UNREACH-NLRI is preserved.

In accordance with the second method for BGP Route distribution, the first 12-bits of the service IP address are stored in the next-hop field and the remaining 20-bits are stored in the service label location of the MP-REACH-NLRI, MP-UNREACH-NLRI. However, it should be understood that the total number of bits, and their distribution, is a design choice that may vary within the scope of the invention. The format of the MP-REACH-NLRI used by the Ingress PE is depicted below.

> Address Family Identifier (2 octets)
> Subsequent Address Family Identifier (1 octet)
> Length of Next Hop Network Address (1 octet)
> Network Address of Next Hop (variable) = service
> IP address's first 12-bits
> Number of SNPAs (1 octet)
> Length of first SNPA(1 octet)
> First SNPA (variable)
> Length of second SNPA (1 octet)
> Second SNPA (variable)
> . . .
> Length of Last SNPA (1 octet)
> Last SNPA (variable)
> Network Layer Reachability Information (variable) = service
> label has other 20-bits of service IP This technique permits a single BGP update message to carry all the VPN routes from a PE device (provided they fit in the update message). However, all service IP addresses in a single PE device should have the same first 3 nibbles (12 bits). Again, the format of the MP-REACH-NLRI, MP-UN-REACH-NLRI is preserved.

In accordance with the third technique for BGP route distribution, the RD value of the VRF is created using the service IP address as the IP address in Type 1 format of RD. In this technique, only RD of Type 1 is supported. The Service label is kept empty in the MP-REACH-NLRI, MP-UNREACH-NLRI. The Type 1 format is as follows: an administration field contains a 4 byte ipv4 address and an assigned number field contains a 2 byte number assigned by the service provider. It is recommended to use a globally unique unicast address such as the PEs router ID or an interface address. For example, for an IP address of 24.24.1.1 and an assigned number of 3, the RD would be 24.24.1.1:3. The format of the MP-REACH-NLRI used by the Ingress PE is depicted below.

> Address Family Identifier (2 octets)
> Subsequent Address Family Identifier (1 octet)
> Length of Next Hop Network Address (1 octet)
> Network Address of Next Hop (variable) = PE
> IP address -continued

```
Number of SNPAs (1 octet)
Length of first SNPA(1 octet)
First SNPA (variable)
Length of second SNPA (1 octet)
Second SNPA (variable)
...
Length of Last SNPA (1 octet)
Last SNPA (variable)
Network Layer Reachability Information (variable) = service
IP is derived from RD value of VPN route
```

Again, the format of the MP-REACH-NLRI, MP-UN-REACH-NLRI is preserved.

In accordance with the fourth technique for BGP route distribution, the MP-REACH-NLRI, MP-UNREACH-NLRI is modified to accommodate the service IP address in addition to service label by introducing a type field in NLRI. The format of the MP-REACH-NLRI depicted below is merely an example, and should not be interpreted as the only implementation within the scope of the invention.

```
Address Family Identifier (2 octets)
Subsequent Address Family Identifier (1 octet)
Length of Next Hop Network Address (1 octet)
Network Address of Next Hop (variable) = PE
IP address
Number of SNPAs (1 octet)
Length of first SNPA(1 octet)
First SNPA (variable)
Length of second SNPA (1 octet)
Second SNPA (variable)
...
Length of Last SNPA (1 octet)
Last SNPA (variable)
Network Layer Reachability Information (variable):
type = service label; length = 4; value = service IP
```

VPN packet forwarding will now be described with reference to FIGS. 3 through 6. When the VRF forwarding plane receives a packet from a CE device, it performs a lookup on the VPN route. The result of the lookup operation is the above-described VPN route's associated service IP header. The VRF forwarding plane encapsulates the CE IP packet with this service IP header and forwards the packet to the (routed core network) next-hop router of the destination IP address of the service IP header. When the destination PE device receives this IP packet, it performs a lookup on the destination IP address of the service IP header. The result of the lookup operation is that the destination PE device associates the destination IP address of the service IP header with its local VRF. It will de-capsulate (remove) the service IP header and perform a lookup on the destination IP address of the customer IP header within the associated VRF FIB. Thus, it will forward the packet appropriately in the VRF to the destined CE device.

Figure 7:
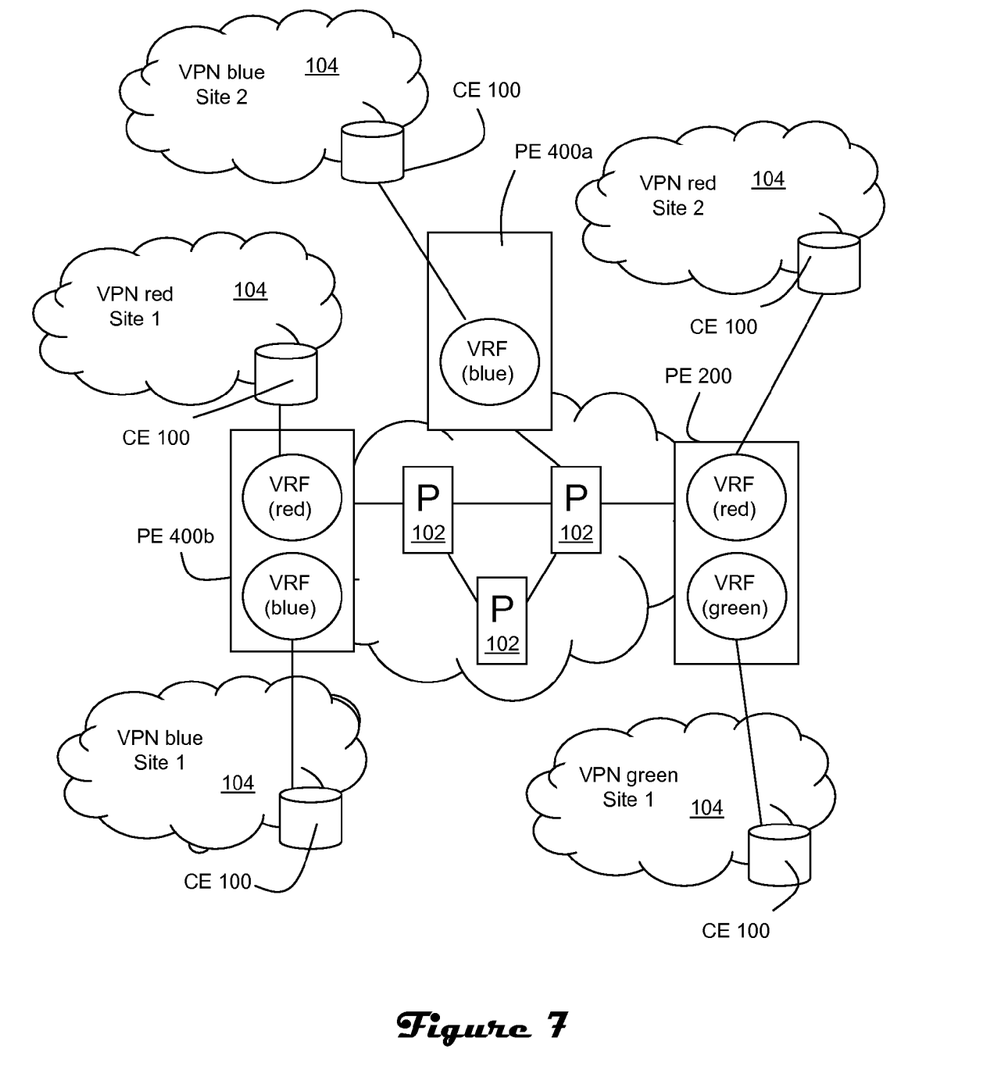
FIG. 7 illustrates an alternative embodiment of the architecture of FIG. 3.

Interoperability of the BGP-based IP-VPN PE devices described above with prior art PE devices is depicted in FIG. 7. PE (200) is a prior art PE device and the PE (400a, 400b) devices operate as described above. PE (400b) will advertise service IP addresses to PE (400a) and a service label to PE (200) for the same VPN route advertisement from MP-iBGP running on PE (400b). PE (400a) and PE (400b) agree on using the service IP addresses, PE (400b) and PE (200) agree on using service labels during the BGP capability exchange. However, PE (400b) and PE (200) won't be able to exchange VPN routes because they won't be able to agree on the capability.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for providing virtual private network service in a routed network, comprising:
 a first edge router comprising:
  a plurality of virtual route forwarders including at least one source virtual route forwarder, each virtual route forwarder having a service IP address comprising an IP address which uniquely identifies that virtual route forwarder in the routed network;
  a protocol engine configured to exchange routes and service IP addresses with a second edge router which has a plurality of virtual route forwarders including at least one destination virtual route forwarder, each virtual route forwarder having a service IP address comprising an IP address which uniquely identifies that virtual route forwarder in the routed network, the exchanged service IP addresses including the service IP addresses associated with the source virtual route forwarder and the destination virtual route forwarder; and
  a forwarding plane configured to encapsulate a received protocol data unit with a service header, the service header including the service IP address associated with the source virtual route forwarder and the service IP address associated with the destination virtual route forwarder, and to transmit the encapsulated protocol data unit to the destination virtual route forwarder of the second edge router, the routed network routing the encapsulated protocol data unit using the service IP addresses, and without using L2TP, MPLS or a GRE-IP tunnel.

2. The apparatus of claim 1 wherein the service IP address of the source virtual route forwarder is a loop-back IP address.

3. The apparatus of claim 1 wherein the service IP address of the source virtual route forwarder is an interface or regular IP address.

4. The apparatus of claim 1 wherein the protocol engine is configured to transmit an update message which includes the service IP address dedicated to the source virtual route forwarder as a next-hop address.

5. The apparatus of claim 4 wherein a next-hop field in MP-REACH-NLRI, MP-UNREACH-NLRI is used to advertise the service IP address.

6. The apparatus of claim 4 wherein an update message is transmitted for each virtual route forwarder by a global routing engine.

7. The apparatus of claim 4 wherein a first portion of the service IP address is stored in a next-hop field and a second portion is stored in a service label location of MP-REACH-NLRI, MP-UNREACH-NLRI.

8. The apparatus of claim 4 wherein an RD value of the source virtual route forwarder is created using the service IP address as the IP address in a route distinguisher field.

9. The apparatus of claim 4 wherein the protocol engine is configured to utilize a modified MP-REACH-NLRI.

10. The apparatus of claim 1 wherein the first edge router stores the service IP address of the destination virtual route forwarder, and associates a VPN route with the service header in memory for subsequent lookup.

11. A method for providing virtual private network service in a device of a routed network, comprising:
   with a first edge router comprising a plurality of virtual route forwarders including at least one source virtual route forwarder, each virtual route forwarder having a service IP address comprising an IP address which uniquely identifies that virtual route forwarder in the routed network:
      exchanging routes and service IP addresses with a second edge router which has a plurality of virtual route forwarders including at least one destination virtual route forwarder, each virtual route forwarder having a service IP address comprising an IP address which uniquely identifies that virtual route forwarder in the routed network, the exchanged service IP addresses including the service IP addresses associated with the source virtual route forwarder and the destination virtual route forwarder;
      encapsulating a received protocol data unit with a service header, the service header including the service IP address associated with the source virtual route forwarder and the service IP address associated with the destination virtual route forwarder; and
      transmitting the encapsulated protocol data unit from the source virtual route forwarder to the destination virtual route forwarder, the routed network routing the protocol data unit without using L2TP, MPLS or a GRE-IP tunnel.

12. The method of claim 11 wherein the service IP address of the source virtual route forwarder is a loop-back IP address.

13. The method of claim 11 wherein the service IP address of the source virtual route forwarder is an interface or regular IP address.

14. The method of claim 11 including the further step of transmitting an update message which includes the service IP address dedicated to the source virtual route forwarder as a next-hop address.

15. The method of claim 14 including the further step of using a next-hop field in MP-REACH-NLRI, MP-UN-REACH-NLRI to advertise the service IP address.

16. The method of claim 14 including the further step of transmitting a separate update message for each virtual route forwarder.

17. The method of claim 14 including the further step of storing a first portion of the service IP address in a next-hop field and storing a second portion in a service label location of MP-REACH-NLRI, MP-UNREACH-NLRI.

18. The method of claim 14 including the further step of creating a route distinguisher value of the source virtual route forwarder using the service IP address as the IP address in a route distinguisher field.

19. The method of claim 14 including the further step of utilizing a modified MP-REACH-NLRI.

20. The method of claim 11 wherein the first edge router stores the service IP address of the destination virtual route forwarder, and associates a VPN route with the service header in memory for subsequent lookup.

\* \* \* \* \*